(12) United States Patent
Brackin et al.

(10) Patent No.: US 9,228,304 B2
(45) Date of Patent: Jan. 5, 2016

(54) SURFACE MOUNT WEDGE BARRIER

(71) Applicants: The Texas A&M University System, College Station, TX (US); Moog Inc., East Aurora, NY (US)

(72) Inventors: Michael S. Brackin, Bryan, TX (US); Dean C. Alberson, Bryan, TX (US); D. Lance Bullard, Jr., College Station, TX (US); Russell J. Norris, Falls Church, VA (US); Craig R. Ackerman, Springfield, VA (US); Donald L. Moffett, Springfield, VA (US); James A. Kowalski, Springville, NY (US)

(73) Assignees: The Texas A&M University System, College Station, TX (US); Moog Inc., East Aurora, NY (US)

( * ) Notice: Subject to any disclaimer, the term of this patent is extended or adjusted under 35 U.S.C. 154(b) by 0 days.

(21) Appl. No.: 14/623,361

(22) Filed: Feb. 16, 2015

(65) Prior Publication Data

US 2015/0159333 A1    Jun. 11, 2015

Related U.S. Application Data

(63) Continuation of application No. 14/043,571, filed on Oct. 1, 2013, now Pat. No. 8,956,072.

(60) Provisional application No. 61/708,489, filed on Oct. 1, 2012.

(51) Int. Cl.
*E01F 13/04* (2006.01)
*E01F 13/08* (2006.01)
*E01F 13/06* (2006.01)
(Continued)

(52) U.S. Cl.
CPC ............... *E01F 13/06* (2013.01); *E01F 9/047* (2013.01); *E01F 13/04* (2013.01); *E01F 13/048* (2013.01); *E01F 13/08* (2013.01); *E01F 13/12* (2013.01); *F16H 25/18* (2013.01); *Y10T 74/18984* (2015.01)

(58) Field of Classification Search
USPC .................................................. 404/6; 49/49
IPC ................... E01F 13/04,13/042, 13/044, 13/08, E01F 13/085, 13/10, 13/105
See application file for complete search history.

(56) References Cited

U.S. PATENT DOCUMENTS 1,262,930 A * 4/1918 Diaz ............................... 404/71
2,175,636 A * 10/1939 Morgan ......................... 49/134
(Continued)

FOREIGN PATENT DOCUMENTS

CN    102677612 A    9/2012
GB      2079356 A    1/1982
(Continued)

OTHER PUBLICATIONS

International Search Report and Written Opinion for PCT Application No. PCT/US2013/062904 mailed Jan. 7, 2014, 12 pages.

*Primary Examiner* — Gary Hartmann
(74) *Attorney, Agent, or Firm* — Tumey L.L.P.

(57) ABSTRACT

The present disclosure relates to a system including an anchor configured to be disposed within a foundation, wherein an upper side of the anchor is configured to be exposed at a surface of the foundation and a wedge-style anti-ram security barrier configured to mechanically couple to the anchor and mount to the surface of the foundation.

20 Claims, 4 Drawing Sheets

(51) Int. Cl.
*F16H 25/18* (2006.01)
*E01F 9/047* (2006.01)
*E01F 13/12* (2006.01)

(56) References Cited

U.S. PATENT DOCUMENTS

| | | | |
|---|---|---|---|
| 3,376,667 A * | 4/1968 | Parr | 49/49 |
| 4,490,068 A | 12/1984 | Dickinson | |
| 4,627,763 A | 12/1986 | Roemer et al. | |
| 4,752,152 A | 6/1988 | Crisp et al. | |
| 4,826,349 A | 5/1989 | Nasatka | |
| 4,828,424 A | 5/1989 | Crisp, Sr. | |
| 4,850,737 A | 7/1989 | Nasatka et al. | |
| 4,861,185 A | 8/1989 | Eikelenboom | |
| 5,228,237 A * | 7/1993 | Nasatka | 49/49 |
| 5,248,215 A * | 9/1993 | Fladung | 404/6 |
| 5,639,178 A * | 6/1997 | Wilson et al. | 404/6 |
| 6,062,765 A | 5/2000 | Dotson | |
| 7,048,467 B2 * | 5/2006 | Burns et al. | 404/6 |
| 7,101,112 B2 * | 9/2006 | Burns et al. | 404/6 |
| 7,114,874 B2 | 10/2006 | Burns et al. | |
| 7,118,304 B2 | 10/2006 | Turpin et al. | |
| 7,320,557 B1 | 1/2008 | Potter | |
| 7,530,759 B2 | 5/2009 | Gelfand et al. | |
| 8,439,594 B1 | 5/2013 | Clark et al. | |
| 8,740,495 B1 * | 6/2014 | Clark et al. | 404/6 |
| 8,956,072 B2 * | 2/2015 | Brackin et al. | 404/6 |
| 2010/0003078 A1 * | 1/2010 | Huang et al. | 404/6 |

FOREIGN PATENT DOCUMENTS

| | | |
|---|---|---|
| WO | 2006058383 A1 | 6/2006 |
| WO | 2007105940 A1 | 9/2007 |

* cited by examiner

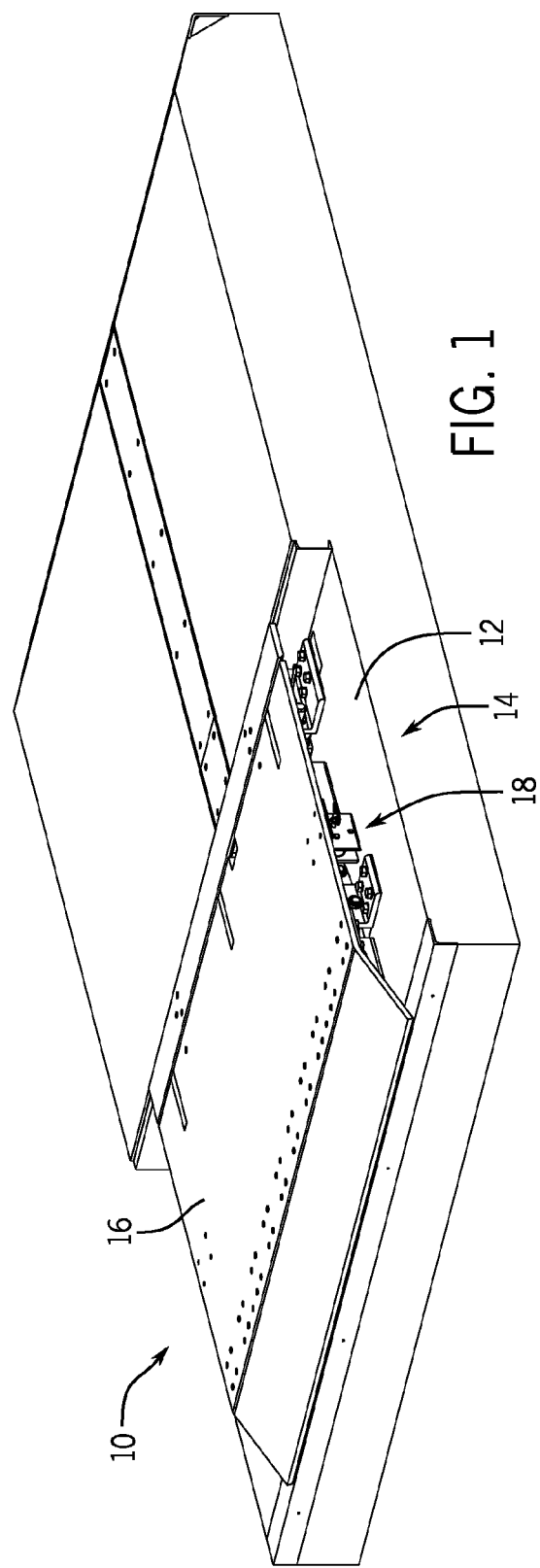
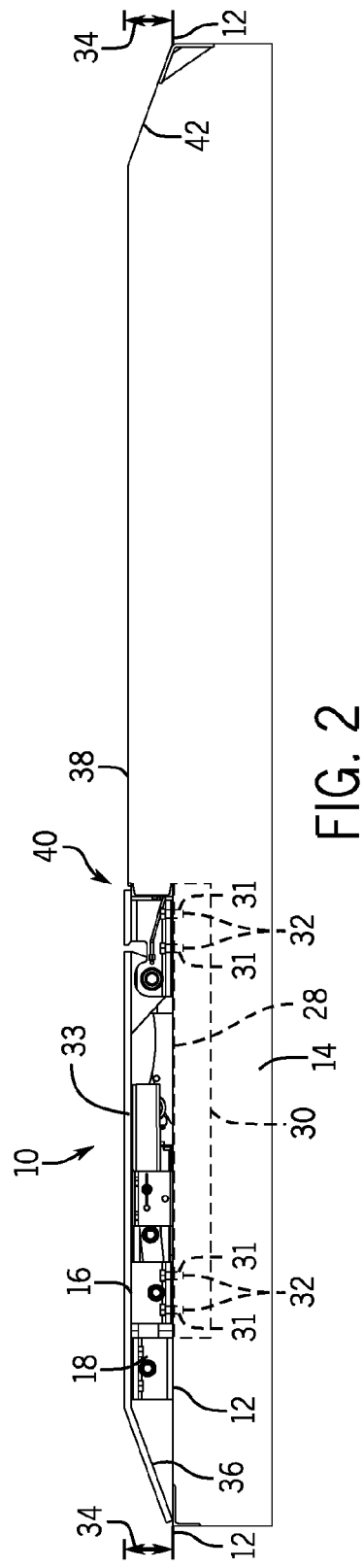

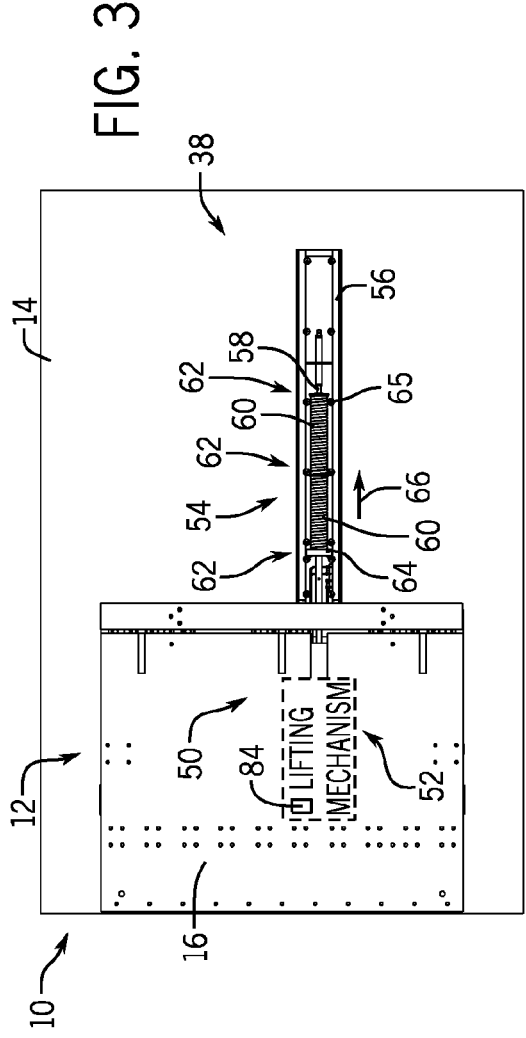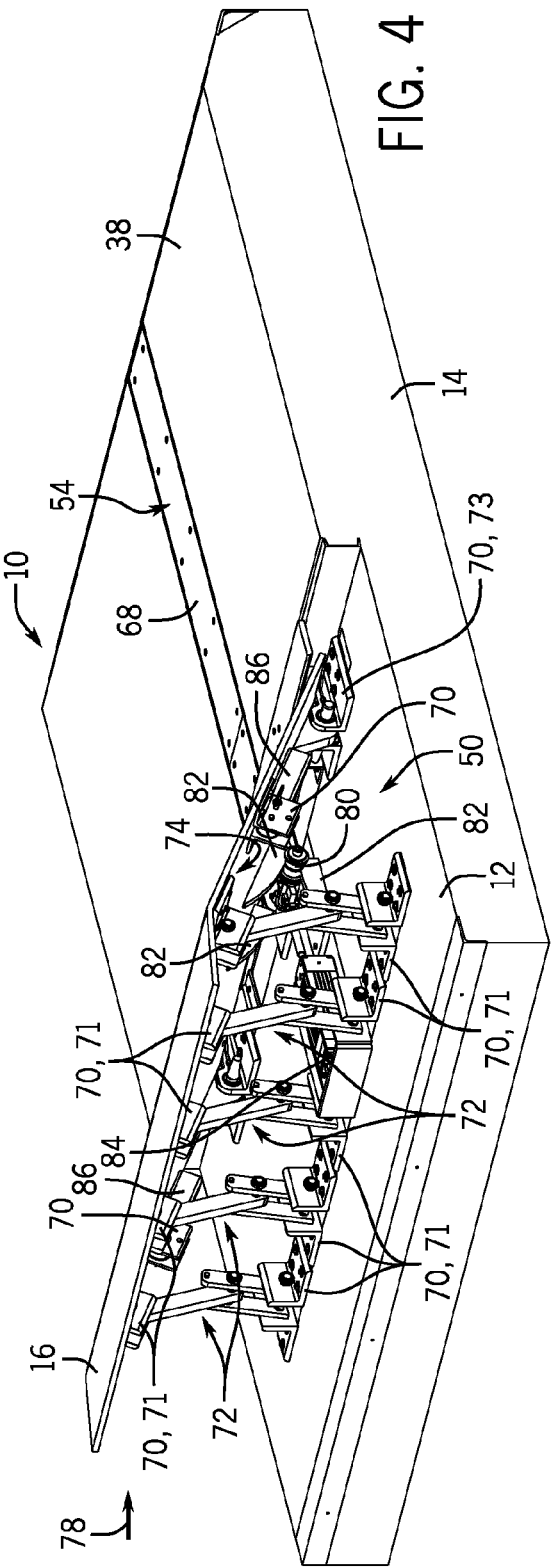

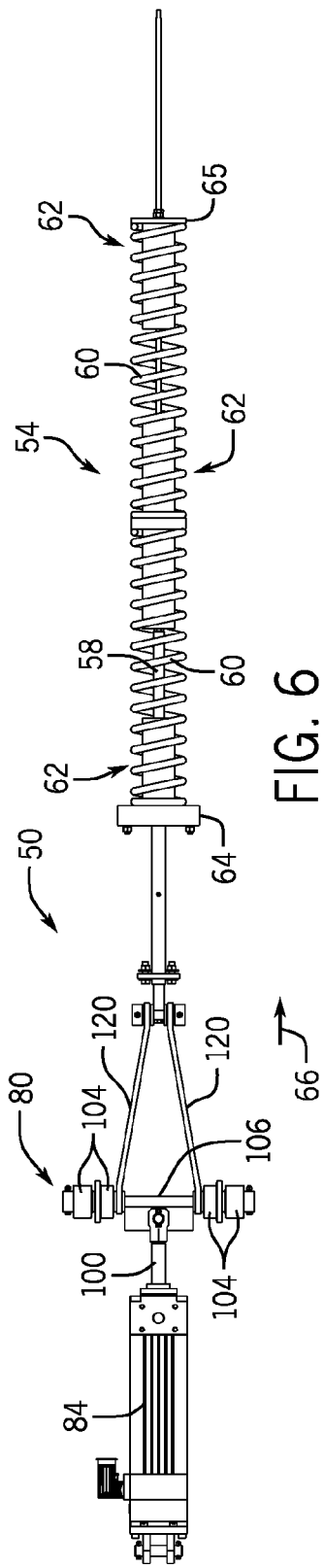
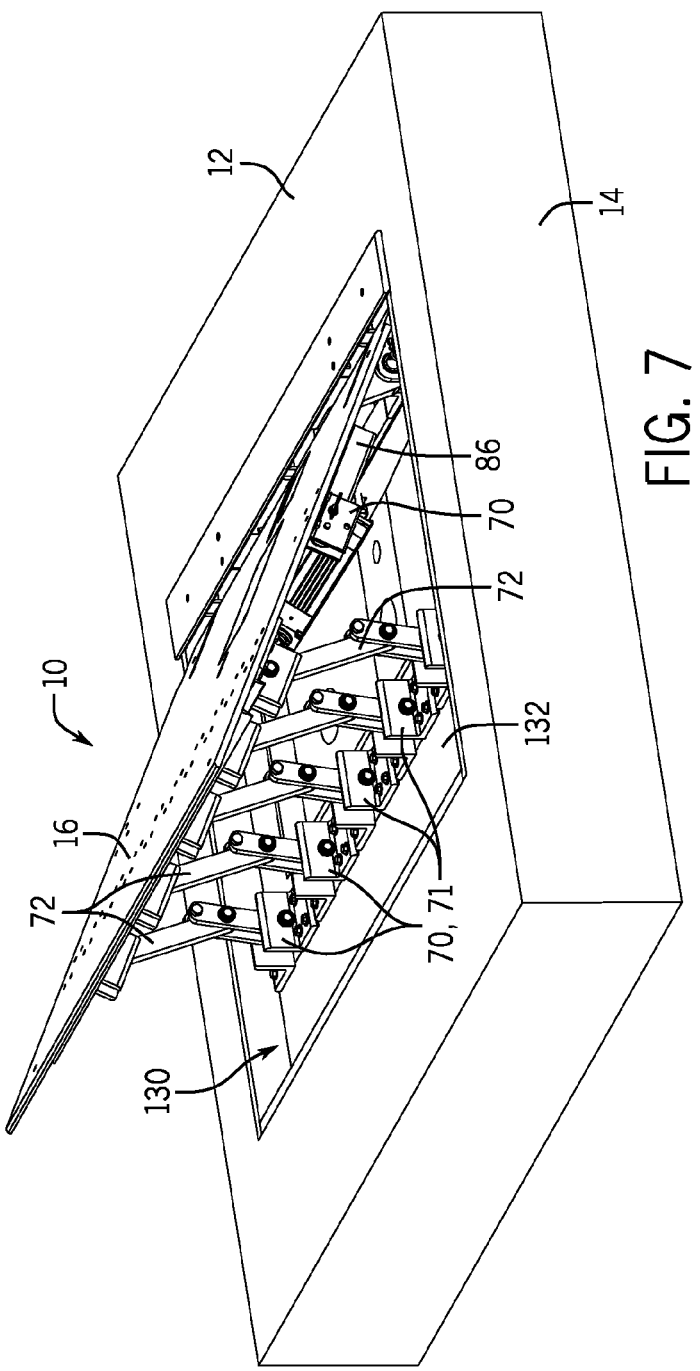
FIG. 6
FIG. 7

SURFACE MOUNT WEDGE BARRIER

CROSS-REFERENCE TO RELATED APPLICATIONS

This application is a continuation of U.S. patent application Ser. No. 14/043,571, entitled "Surface Mount Wedge Barrier," filed Oct. 1, 2013, which is hereby incorporated by reference in its entirety, and which claims priority to and benefit of U.S. Provisional Patent Application No. 61/708,489, entitled "Surface Mount Wedge Barrier," filed Oct. 1, 2012, which is hereby incorporated by reference in its entirety.

STATEMENT REGARDING FEDERALLY SPONSORED RESEARCH & DEVELOPMENT

This invention was made with Government support under grant number S-DSASD-10-CA-201 awarded by the U.S. State Department. The Government has certain rights in the invention.

BACKGROUND

Anti-ram security barriers may be used to secure a property's perimeter access points while maintaining access control. For example, an anti-ram security barrier may be engaged or deployed to block vehicles and/or personnel from entering or accessing a property. Specifically, such barriers are generally designed to withstand a ramming force from a vehicle when deployed. Additionally, an anti-ram security barrier may be disengaged or retracted to allow vehicles and/or personnel to access a property. Indeed, traditional anti-ram security barriers may be raised and lowered to block or allow access to a property, respectively.

BRIEF DESCRIPTION OF THE DISCLOSURE

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an anchor configured to be disposed within a foundation, wherein an upper side of the anchor is configured to be exposed at a surface of the foundation and a wedge-style security barrier configured to mechanically couple to the anchor and mount to the surface of the foundation.

In a second embodiment, a system includes a lifting mechanism having a first cam surface coupled to a wedge plate of a wedge-style anti-ram security barrier, a second cam surface coupled to a surface of a foundation, a cam configured to translate along and between the first and second cam surfaces, and an electromechanical actuator configured to actuate translation of the cam.

In a further embodiment, a system includes an anchor configured to be disposed within a foundation, wherein an upper side of the anchor is configured to be exposed at a surface of the foundation, a security barrier configured to mechanically couple to the anchor and mount to the surface of the foundation, and a lifting mechanism configured to lift a wedge plate of the security barrier. The lifting mechanism includes a first cam surface coupled to the wedge plate, a second cam surface coupled to the surface of the foundation, and a cam configured to translate along and between the first and second cam surfaces.

BRIEF DESCRIPTION OF THE DRAWINGS

These and other features, aspects, and advantages of embodiments of the present disclosure will become better understood when the following detailed description is read with reference to the accompanying drawings in which like characters represent like parts throughout the drawings, wherein:

FIG. 1 is a front perspective view of an embodiment of a surface-mounted wedge-style barrier in a retracted position;

FIG. 2 is a side view of an embodiment of the surface-mounted wedge-style barrier in a retracted position;

FIG. 3 is a top view of an embodiment of a surface-mounted wedge-style barrier in a retracted position;

FIG. 4 is front perspective view of an embodiment of a surface-mounted wedge-style barrier in a deployed position;

FIG. 6 is a top view of an embodiment of the a lifting mechanism of the surface-mounted wedge-style barrier; and FIG. 7 is a front perspective view of an embodiment of a surface-mounted wedge-style barrier in a deployed position.

DETAILED DESCRIPTION OF SPECIFIC EMBODIMENTS

Figure 5:
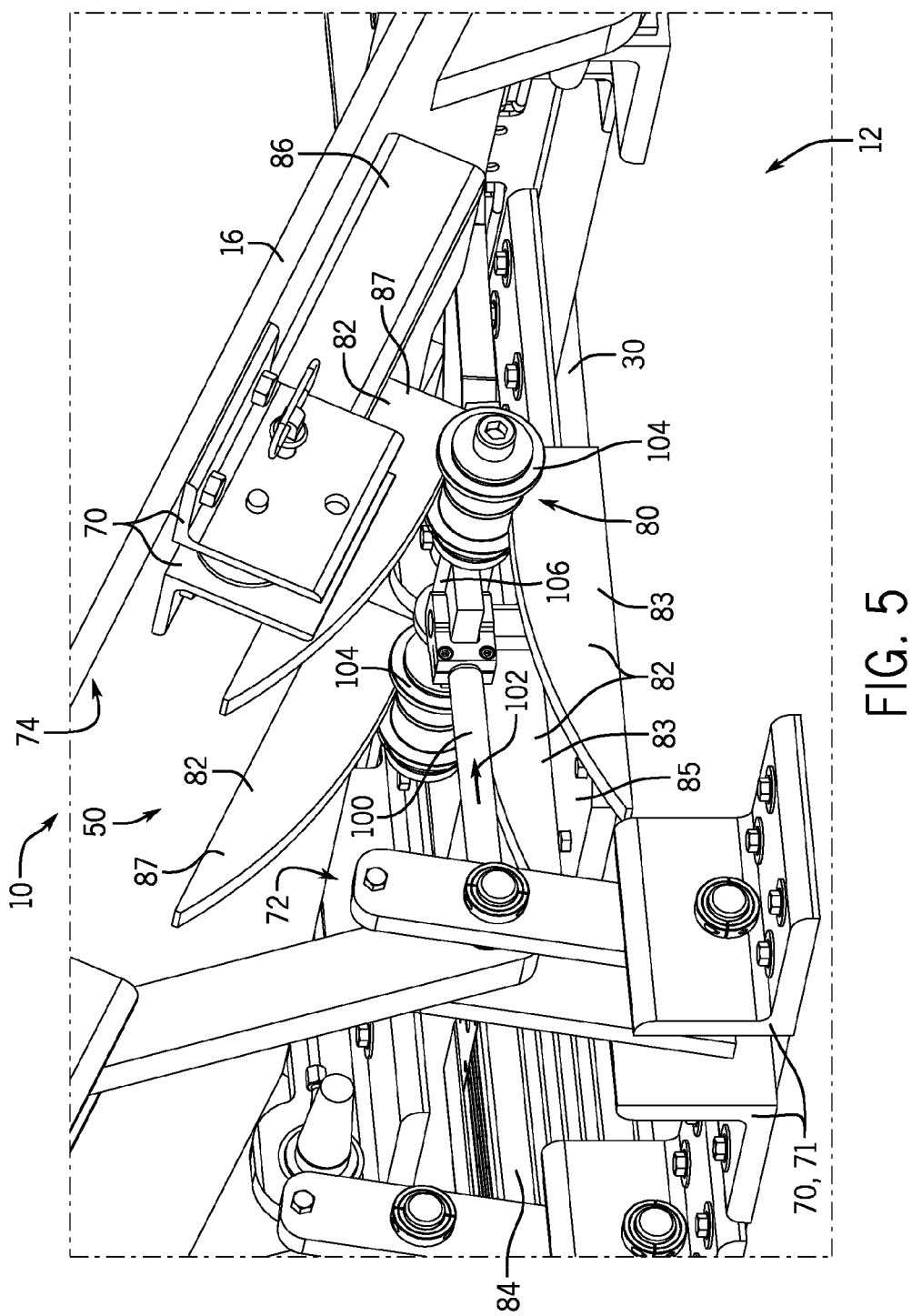
FIG. 5 is a partial front perspective view of an embodiment of a surface-mounted wedge-style barrier in a deployed position, illustrating an embodiment of a lifting mechanism of the surface-mounted wedge-style barrier.

Specific embodiments of the present disclosure will be described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

The subject matter disclosed herein relates to surface-mounted wedge-style anti-ram security barriers. More specifically, embodiments of the present disclosure include wedge-style barriers that may be secured to a shallow foundation or surface and/or may be flush at grade. In other words, the wedge-style barriers disclosed herein are capable of operation without being mounted in below grade pits. Traditional wedge-style barriers, and components to lift such barriers, are generally housed in below grade pits, which can complicate maintenance and repair of the wedge-style barriers. For example, drainage and debris removal beneath the wedge-style barriers, which are important for wedge-style barriers to operate properly, can be difficult. Additionally, repair or removal of traditional wedge-style barriers requires the complete installation to be removed and replaced.

As discussed in detail below, the surface-mounted configuration of present embodiments enables a reduction in drainage and debris removal efforts below the wedge-style barriers. Furthermore, as the wedge-style barrier is capable of being mounted above grade, various components of the wedge-style barrier may not be exposed to harsh environments below grade, where debris and other material may collect. Moreover, components of the disclosed wedge-style barriers may be bolted together, which enables easier and improved maintenance, repair, or replacement of an individual component. For example, in the event of a nuisance or intentional impact with the wedge-style barrier, the damaged components can be replaced in short order. As discussed in detail below, when the surface-mounted wedge-style barrier is in a retracted position, the wedge-style barrier may serve as a traffic calming system, such speed table or bump. However, in other embodiments, the wedge-style barrier may be flush with a surrounding surface when in the retracted position. When the surface-mounted wedge-style barrier is in a deployed position, the wedge-style barrier may function as an anti-ram security barrier to reduce or block access to a property or path.

In the following discussion, reference is made to a surface of a foundation to which the wedge-style barrier is mounted. As discussed below, the wedge-style barrier is coupled to an upper side of an anchor or subframe secured within a foundation. For example, in the illustrated embodiments, the upper side of the anchor is substantially flush with the surface of the foundation. In such embodiments, the wedge-style barrier may be mounted directly to the surface of the foundation. However, in other embodiments, the upper side of the anchor may be slightly raised above the surface of the foundation or slightly recessed below the surface of the foundation.

FIG. 1 is a front perspective view of an embodiment of a surface-mounted wedge-style barrier 10. As shown, the barrier 10 is mounted to a surface 12 of a foundation 14 (e.g., a shallow foundation). For example, the foundation 14 and the surface 12 to which the barrier 10 is secured may be made from concrete. As discussed below with reference to FIG. 2, the barrier 10 is mounted to or includes an anchor or subframe (e.g., anchor 30 shown in FIG. 2) secured beneath the surface 12. For example, the barrier 10 may be bolted to the anchor or secured to the anchor by other mechanical fasteners.

In the illustrated embodiment, the barrier 10 includes a wedge plate 16, which includes a portion that is substantially parallel with the surface 12 when the barrier 10 is in the retracted position. As a result, the barrier 10 may serve as a traffic calming system, such as a speed table or speed bump. In other words, vehicles or people may pass over the barrier 10 when the barrier 10 is in the retracted position and experience slight elevation relative to the surface 12 while on the barrier 10. As discussed in detail below, when the barrier 10 is in the deployed position, the wedge plate 16 is held and supported in a raised position by a lifting mechanism of the barrier 10. When the barrier 10 is in the deployed position, the wedge plate 16 may block vehicles or people from passing over or through the barrier 10. In certain embodiments, the wedge plate 16 may be made from a metal, such as steel.

The barrier 10 includes a variety of components, indicated in FIG. 1 by reference numeral 18, disposed beneath the wedge plate 16. As discussed in detail below, the components 18 serve to lift and support the wedge plate 16 when the barrier 10 is in the deployed position. In certain embodiments, the components 18 may be off-the-shelf parts or other components that are readily available. Additionally, the components 18 may be bolted or otherwise mechanically coupled to one another. In this manner, repair or replacement of one or more components 18 may be simplified and streamlined. That is, repair or replacement of single components 18 may be done more quickly, easily, and cost effectively.

FIG. 2 is a side view of the surface-mounted wedge-style barrier 10 in a retracted position, illustrating the securement of the barrier 10 to an anchor 30 secured beneath the surface 12 of the foundation 14. In certain embodiments, the anchor 30 may be a steel frame including plates, beams (e.g., I-beams), and/or other structures that are secured within the foundation 14, which may be concrete. At the surface 12, an upper side 28 of the anchor 30 may be at least partially exposed, thereby enabling the attachment of the barrier 10 to the anchor 30. For example, holes or apertures 31 (e.g., threaded holes) in one or more beams or plates of the anchor 30 may be exposed to the surface 12. In this manner, bolts 32 or other mechanical fasteners may be used to secure the barrier 10 to the anchor 30. As the barrier 10 is mounted to the surface 12 of the foundation 14, collection of debris and other material beneath the barrier may be reduced, and components of the barrier 10 may not be exposed to below grade environments.

As mentioned above, in the retracted position, the wedge plate 16 of the barrier 10 is lowered and its main or upper portion 33 is substantially parallel with the surface 12. As a result, vehicles and/or people may pass over the barrier 10. Additionally, the barrier 10 may serve as a traffic controlling device when in the retracted position. In the illustrated embodiment, the wedge plate 16 acts as a speed table in the retracted position. That is, when the barrier 10 is in the retracted position, the upper portion 33 of the wedge plate 16 is elevated a distance 34 above the surface 12 that facilitates passage of vehicles over the barrier. As shown, the wedge plate 16 includes an incline portion 36 which enables a person or vehicle traveling along the surface 12 and toward the barrier 10 to transition up the distance 34 and then across the upper portion 22 of the wedge plate 16. In certain embodiments, the distance 34 may be approximately 5, 6, 7, 8, 9, 10, or 12 inches. Furthermore, the upper portion 22 of the wedge plate 16 is substantially flush with an elevated surface 38 of the foundation 14 at a rear 40 of the barrier 10. As a result, a traveling vehicle or person may pass across the wedge plate 16 of the barrier 10 and onto the elevated surface 38 of the foundation 14. The foundation 14 further includes a decline portion 42, which decreases the grade of the foundation 14 by the distance 34 to be level with the surface 12. Consequently, the barrier 10 and the elevated surface 38 of the foundation 14 may jointly serve as a traffic calming system (e.g., a speed table or speed bump).

FIG. 3 is a schematic top view of the surface-mounted wedge-style barrier 10 in a retracted position, illustrating a lifting mechanism 50 of the barrier 10. As mentioned above, the lifting mechanism 50 is configured to lift and support the wedge plate 16 when the barrier 10 is in the deployed position. As indicated by reference numeral 52, the lifting mechanism 50 includes components disposed beneath the wedge plate 16. For example, the components 52 beneath the wedge plate 16 may include an electromechanical actuator, a cam, one or more cam surfaces, and so forth.

Additionally, the lifting mechanism 50 includes a spring assembly 54. The spring assembly 54 is disposed within a recess 56 formed in the elevated surface 38 of the foundation 14 and includes a spring rod 58 with one or more springs 60 disposed about the spring rod 58. The spring rod 58 is coupled to a cam (e.g., cam 80 shown in FIG. 4) of the lifting mechanism 50. The springs 60 disposed about the spring rod 58 are held in compression by spring supports 62, including a fixed spring support 64. That is, the fixed spring support 64 is fixed relative to the foundation 14 and the rest of the barrier 10. Additionally, the spring support 62 at the end of the spring rod 58 (e.g., spring support 65) may be fixed to the end of the spring rod 58 to enable compression of the springs 60. As the springs 60 are compressed between the spring supports 62, the spring assembly 54 generates a force acting on the cam coupled to the spring rod 58 in a direction 66. The force created by the spring assembly 54 reduces the remaining force needed to move the cam and lift or deploy the wedge plate 16. For example, the remaining force applied to the cam to deploy the wedge plate 16 may be provided by an electromechanical actuator 84 or other actuator. As such, the spring assembly 54 and the actuator 84 (e.g., electromechanical actuator) may operate together to translate the cam and lift the wedge plate 16. As discussed in detail below, when the cam is translated in the direction 66, the cam translates along and between curved or arcuate cam surfaces, thereby spreading the cam surfaces apart and lifting the wedge plate 16.

As mentioned above, the spring assembly 54 exerts a constant force on the cam, while the electromechanical actuator may be controlled to exert a variable force on the cam, thereby enabling the lifting and lowering (i.e., deploying and retracting) of the wedge plate 16. In certain embodiments, the constant force applied by the spring assembly 54 may be adjustable. For example, the tension or force generated by the springs 60 may be adjusted such that the barrier 10 may fail up, mid-way, or down if the actuator (e.g., electromechanical actuator) is disabled.

As will be appreciated, the spring assembly 54 may be covered and protected from debris or other elements by a cover plate (e.g., cover plate 68 shown in FIG. 4) that may be substantially flush with the elevated surface 38 of the foundation 14. Furthermore, the springs 60 are located on a protected side (e.g., a back or rear side) of the wedge-style barrier 10. In this manner, the springs 60 may be easily accessible for maintenance, while also protecting the springs 60 from tampering or disablement. The lifting mechanism 50 is described in further detail below, with reference to FIG. 6.

FIG. 4 is a front perspective view of an embodiment of the surface-mounted wedge-style barrier 10, illustrating the barrier 10 in a deployed position. That is, the wedge plate 16 is lifted and supported by the lifting mechanism 50. As mentioned above, in the deployed position, the wedge plate 16 serves to block access or travel beyond the barrier 10. For example, the barrier 10 (e.g., the wedge plate 16) may block pedestrians or vehicles from accessing a property or pathway.

As discussed above, the barrier 10 is attached to the anchor 30 secured within the foundation 14, thereby mounting the barrier 10 to the foundation 14. As shown in the illustrated embodiment, the barrier 10 is secured to the surface 12 (e.g., the anchor 30) with brackets 70 (e.g., L-shaped brackets). For example, the brackets 70 may be coupled to the anchor 30 beneath the surface 12 by bolts, nuts, threaded fasteners, or other types of mechanical fasteners. In the illustrated embodiment, the barrier 10 includes front brackets 71 and rear brackets 73. The rear brackets 73 are fixed to the surface 12 (e.g., the anchor 30) and are coupled to the wedge plate 16 to form a hinged connection. The hinged connection between the wedge plate 16 and the rear brackets 73 enable the wedge plate 16 to pivot about the rear brackets 73.

The front brackets 71 are coupled to respective linkage assemblies 72 that are further coupled to an underside 74 of the wedge plate 16 with additional front brackets 71. For example, barrier 10 may include 2, 3, 4, 5, 6, or more linkage assemblies 72 disposed between the surface 12 and the wedge plate 12 and coupled to respective front brackets 71. The linkage assemblies 72 may each include one or more bars or other members that are coupled to the front brackets 71. The bars or other members of the linkage assemblies 72 may be coupled to one another by bolts, pins, or other coupling mechanisms that enable the bars of the linkage assemblies 72 to pivot relative to one another. The bars or members of the linkage assemblies 72 may be similarly coupled to the front brackets 71 fixed to the surface 12 and the wedge plate 16. As a result, the linkage assemblies 72 may pivot and rotate to enable the collapse and extension of the linkage assemblies 72 during retraction and deployment of the barrier 10.

The linkage assemblies 72 cause movement of the wedge plate 16 to be restricted. For example, if a vehicle is traveling towards the deployed wedge plate 16 (e.g., in a direction 78), the linkage assemblies 72 and the front brackets 71 may restrict movement of the wedge plate 16 (e.g., upward movement) beyond a certain point. In other words, the wedge plate 16 may remain relatively fixed in the deployed position, thereby enabling the wedge plate 16 to block a vehicle traveling towards the barrier 10. Indeed, the barrier 10 may be configured to stop a vehicle traveling at approximately 30, 40, 50 miles per hour or more.

As shown, the lifting mechanism 50 includes a cam 80 disposed between cam surfaces 82 (e.g., curved or arcuate cam surfaces). The lifting mechanism 50 further includes an electromechanical actuator 84 coupled to the cam 80. The operation of the electromechanical actuator 84, the cam 80, and the cam surfaces 82 is discussed in further detail with respect to FIG. 5. In the illustrated embodiment, the barrier 10 also includes safety legs 86 coupled to the underside 74 of the wedge plate 16 by additional brackets 70. The safety legs 86 may be deployed or extended to support the wedge plate 16 when the wedge plate 16 is in the deployed position. For example, in one circumstance, the safety legs 86 may be extended during maintenance of the barrier 10. When the safety legs 86 are deployed, the safety legs 86 support the weight of the wedge plate 16 against the surface 12. As a result, the lifting mechanism 50 may be deactivated, serviced, removed, replaced, and so forth. Additionally, other components of the barrier 10 may be replaced when the safety legs 86 are extended and supporting the wedge plate 16 in the deployed position.

FIG. 5 is partial perspective view of an embodiment of the surface-mounted wedge-style barrier 10, illustrating the cam 80 and the cam surfaces 82 of the lifting mechanism 50. Specifically, two cam surfaces 82, which are referred to as lower cam surfaces 83, are positioned below the cam 80. The lower cam surfaces 83 may be fixed to the surface 12 (e.g., anchor 30) by a mounting plate 85. For example, the lower cam surfaces 83 and the mounting plate 85 may form a single piece that is secured to the anchor 30 by bolts or other mechanical fasteners. Additionally, two cam surfaces 82, which are referred to as upper cam surfaces 87, are positioned above the cam 80 and coupled to (e.g., welded) to the underside 74 of the wedge plate 16. In other embodiments, intervening layers or plates may be positioned between the surface 12 and the lower cam surfaces 83 and/or the wedge plate 16 and the upper cam surfaces 87

As mentioned above, the cam 80 translates along the cam surfaces 82 when the wedge plate 16 is lifted from the retracted position to the deployed position. Specifically, the electromechanical actuator 84, which is coupled to the cam 80 by a rod 100 in the illustrated embodiment, applies a force in a direction 102, which moves the cam 80 in the direction 102. Additionally, as mentioned above, the spring assembly 54 (see FIG. 3) may provide a force acting on the cam 80 in the direction 102 via spring rod 58, which may reduce the force the electromechanical actuator 84 is required to apply to the cam 80 in order to actuate and lift the wedge plate 16. As the cam 80 travels along the cam surfaces 82, which are curved, in the direction 102, the wedge plate 16 is lifted from the retracted position (see FIG. 1) to the deployed position (see FIG. 4). As shown, the cam 80 includes track wheels 104

(e.g., rollers), which contact and translate along the cam surfaces 82 during operation. That is, the track wheels 104 rotate about a bar 106 as the track wheels 104 translate along the cam surfaces 82. In certain embodiments, bushings may be disposed between the track wheels 104 and the bar 106 to facilitate or improve rotation of the track wheels 104. For example, the bushings may be made from a metal, such as brass.

FIG. 6 is a schematic top view of the lifting mechanism 50. As discussed above, the lifting mechanism 50 includes the spring assembly 54 and the electromechanical actuator 84 coupled to the cam 80. Springs 60 are disposed about the spring rod 58 and are held in compression by spring supports 62, including the fixed spring support 64, which is fixed relative to the foundation 14 and the barrier 10, and the spring support 65, which is fixed to the end of the spring rod 58. The spring assembly 54 is coupled to the cam 80 by extension brackets 120. Specifically, the extension brackets 120 couple the spring rod 58 to the bar 106 of the cam 80. As a result, the force generated by the spring assembly 54 acts on the cam 80 in the direction 66.

Additionally, as discussed above, the electromechanical actuator 84 is coupled to the cam 80 by a rod 100. During deployment of the barrier 10, the electromechanical actuator 84 applies a force on the cam 80 in the direction 66, which causes the cam 80 to move in the direction 66. As discussed above, when the cam 80 is actuated in the direction 66, the track wheels 104 of the cam 80 translate along the cam surfaces 82 of the barrier 10, thereby lifting the wedge plate 16 from a lowered (e.g., retracted) position to a raised (e.g., deployed) position.

FIG. 7 is a front perspective view of an embodiment of the surface-mounted wedge-style barrier 10, illustrating the barrier 10 in a flush-mounted configuration. That is, when the barrier 10 is in the retracted position, the wedge plate 16 will be substantially flush with the surface 12. Accordingly, the barrier 10 is mounted within a recess 130 formed in the foundation 14.

The barrier 10 shown in FIG. 7 includes similar elements and element numbers as the embodiments discussed above. For example, as similarly described above with respect to FIG. 2, the barrier 10 may be secured to the anchor 30 disposed beneath a bottom surface 132 of the recess 130. As the wedge plate 16 is substantially flush with the surface 12 of the foundation 14 when the barrier 10 is in the retracted position, the barrier 10 may not serve as a traffic calming device when the barrier 10 is in the retracted position. Rather, the barrier 10 may not interrupt foot or vehicle traffic at all when the barrier 10 is in the retracted position.

As discussed in detail above, the present disclosure is directed towards surface-mounted wedge-style anti-ram security barriers. Specifically, embodiments of the present disclosure include wedge-style barriers that may be secured to a shallow foundation or surface and/or may be flush at grade. For example, a wedge-style barrier in accordance with present embodiments may operate without being mounted in a below grade pit. The surface-mounted configuration enables a reduction in drainage and debris removal efforts below the wedge-style barriers. Furthermore, as the wedge-style barrier may be mounted above grade, various components of the wedge-style barrier may not be exposed to harsh environments below grade, where debris and other material may collect. Moreover, various components of the disclosed wedge-style barriers may be bolted together, which enables easier and improved maintenance, repair, or replacement of an individual component. As discussed above, when the surface-mounted wedge-style barrier is in a retracted position, the wedge-style barrier may serve as a traffic calming system, such speed table or bump. However, in other embodiments, the wedge-style barrier may be flush with a surrounding surface when in the retracted position. When the surface-mounted wedge-style barrier is in a deployed position, the wedge-style barrier may function as an anti-ram security barrier to reduce or block access to a property or path.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    an anchor comprising a body portion configured to be disposed below a recess of a foundation, wherein an upper side of the anchor is configured to be exposed at a surface of the recess of the foundation, and wherein the upper side of the anchor is configured to be substantially flush with the surface of the recess of the foundation; and
    a wedge-style security barrier configured to mechanically couple to the anchor via at least one linkage assembly and thus mount to the surface within the recess of the foundation, wherein the surface of the recess extends from a front of the wedge-style security barrier to a rear of the wedge-style security barrier, and wherein the wedge-style security barrier and the at least one linkage assembly are entirely above the surface when the wedge-style security barrier is in a refracted position.

2. The system of claim 1, wherein the wedge-style security barrier comprises a wedge plate configured to raise and lower in response to an actuation force.

3. The system of claim 2, comprising a lifting mechanism configured to apply the actuation force.

4. The system of claim 3, wherein the lifting mechanism comprises:
    a first cam surface coupled to the wedge plate;
    a second cam surface coupled to the surface of the foundation;
    a cam configured to translate along and between the first and second cam surfaces; and
    an electromechanical actuator configured to actuate translation of the cam.

5. The system of claim 4, wherein the lifting mechanism comprises a spring assembly coupled to the cam, wherein the spring assembly is disposed on a protected side of the wedge-style security barrier when the wedge plate is deployed.

6. The system of claim 5, wherein the spring assembly comprises at least one spring disposed about a spring rod, wherein the spring rod is coupled to the cam, and the at least one spring is in compression between a plurality of spring supports disposed about the spring rod.

7. The system of claim 6, wherein the cam comprises track wheels disposed about a bar, and the bar is coupled to the spring rod by extension brackets.

8. The system of claim 2, wherein the wedge plate is configured to be flush with a top surface of the foundation when the wedge plate is retracted.

9. The system of claim 1, wherein the wedge-style security barrier is mechanically coupled to the upper side of the anchor by bolts engaged with apertures formed in the upper side of the anchor.

10. A system, comprising:
    a foundation comprising a recess;
    a subframe comprising a body portion disposed within the foundation and below the recess, wherein the subframe comprises an upper surface that is substantially flush with a bottom surface of the recess; and a wedge-style anti-ram security barrier disposed within the recess, wherein the wedge-style anti-ram security barrier is mechanically coupled to the upper surface of the subframe via at least one linkage assembly, wherein the bottom surface of the recess extends from a front of the wedge-style anti-ram security barrier to a rear of the wedge-style anti-ram security barrier, and wherein the wedge-style anti-ram security barrier and the at least one linkage assembly are entirely above the bottom surface when the wedge-style anti-ram security barrier is in a retracted position.

11. The system of claim 10, wherein the wedge-style anti-ram security barrier comprises a wedge plate configured to raise and lower in response to an actuation force.

12. The system of claim 11, wherein the wedge plate is configured to be flush with a top surface of the foundation when the wedge plate is retracted.

13. The system of claim 11, comprising a lifting mechanism configured to apply the actuation force, wherein the lifting mechanism comprises:
 a first cam surface coupled to the wedge plate;
 a second cam surface coupled to the bottom surface the recess;
 a cam configured to translate along and between the first and second cam surfaces; and
 an electromechanical actuator configured to actuate translation of the cam.

14. The system of claim 13, wherein the lifting mechanism comprises a spring assembly coupled to the cam, wherein the spring assembly is disposed on a protected side of the wedge-style anti-ram security barrier when the wedge plate is deployed.

15. The system of claim 14, wherein the spring assembly comprises at least one spring disposed about a spring rod, wherein the spring rod is coupled to the cam, and the at least one spring is in compression between a plurality of spring supports disposed about the spring rod.

16. The system of claim 10, wherein the subframe comprises apertures exposed to the recess, the apertures are flush with the bottom surface of the recess, and the wedge-style anti-ram security barrier is mechanically coupled to the subframe via bolts extending into the apertures.

17. A system, comprising:
 an anchor comprising a body portion configured to be disposed within a foundation and below a recess of the foundation, wherein an upper side of the anchor is configured to be substantially flush with a bottom surface of the recess;
 a security barrier configured to mechanically couple to the upper side of the anchor via at least one linkage assembly and thus mount to the bottom surface of the recess; and
 a lifting mechanism configured to lift a wedge plate of the security barrier,
 wherein the bottom surface of the recess extends from a front of the wedge plate to a rear of the wedge plate, and wherein the security barrier and the at least one linkage assembly are entirely above the bottom surface when the security barrier is in a retracted position.

18. The system of claim 17, wherein the lifting mechanism comprises:
 a first cam surface coupled to the wedge plate;
 a second cam surface coupled to the bottom surface of the recess; and
 a cam configured to translate along and between the first and second cam surfaces.

19. The system of claim 18, wherein the lifting mechanism comprises a spring assembly coupled to the cam, wherein the spring assembly is disposed on a protected side of the security barrier when the wedge plate is deployed, wherein the spring assembly comprises at least one spring disposed about a spring rod, wherein the spring rod is coupled to the cam, and the at least one spring is in compression between a plurality of spring supports disposed about the spring rod.

20. The system of claim 17, wherein the wedge plate is configured to be flush with a top surface of the foundation when the wedge plate is retracted.

* * * * *